US009180621B2

(12) United States Patent
Sato et al.

(10) Patent No.: US 9,180,621 B2
(45) Date of Patent: Nov. 10, 2015

(54) BLOW MOLDING DEVICE

(71) Applicant: Discma AG, Hunenberg (CH)

(72) Inventors: Sumito Sato, Tokyo (JP); Nobuyuki Tamura, Tokyo (JP); Takeshi Nagashima, Tokyo (JP); Shigeki Morikami, Tokyo (JP)

(73) Assignee: Discma AG, Hünenberg (CH)

( * ) Notice: Subject to any disclaimer, the term of this patent is extended or adjusted under 35 U.S.C. 154(b) by 0 days.

(21) Appl. No.: 14/376,053

(22) PCT Filed: Jan. 16, 2013

(86) PCT No.: PCT/JP2013/000152
§ 371 (c)(1),
(2) Date: Jul. 31, 2014

(87) PCT Pub. No.: WO2013/114796
PCT Pub. Date: Aug. 8, 2013

(65) Prior Publication Data
US 2014/0356475 A1 Dec. 4, 2014

(30) Foreign Application Priority Data

Jan. 31, 2012 (JP) .................. 2012-019016
May 30, 2012 (JP) .................. 2012-123081

(51) Int. Cl.
*B29C 49/58* (2006.01)
*B29C 49/42* (2006.01)
(Continued)

(52) U.S. Cl.
CPC .............. *B29C 49/58* (2013.01); *B29C 49/06* (2013.01); *B29C 49/4289* (2013.01);
(Continued)

(58) Field of Classification Search
CPC ............... B29C 2049/465; B29C 2049/4655; B29C 2049/4664; B29C 2049/5803; B29C 2049/5858; B29C 2049/1242; B29C 49/58; B20C 49/4242
USPC ......................................... 425/524
See application file for complete search history.

(56) References Cited

U.S. PATENT DOCUMENTS 4,671,762 A *  6/1987  Weiler et al. ................. 425/524
8,684,723 B2 * 4/2014  Lisch et al. .................. 425/524
(Continued)

FOREIGN PATENT DOCUMENTS

DE    102011012751 A1 *  9/2012
EP        1529620 A1 *  5/2005
(Continued)

OTHER PUBLICATIONS

International Search Report issued in International Application No. PCT/JP2013/000152 dated Mar. 19, 2013 (with translation).

*Primary Examiner* — Robert B Davis
(74) *Attorney, Agent, or Firm* — Honigman Miller Schwartz and Cohn LLP; Eric J. Sosenko; Jonathan P. O'Brien

(57) ABSTRACT

A blow molding device includes a blow nozzle to be inserted tightly into a mouth tube section of preform when the preform is inserted in a mold. The blow molding device also includes a pressurized liquid feeding unit and feeds a pressurized liquid from the pressurized liquid feeding unit into the preform through the blow nozzle to form a container into an expanded shape along a cavity of the mold. A valve mechanism, provided at a downstream end of a feed channel for the liquid in the blow nozzle, can open and close the feed channel so that when the valve mechanism is in a closed state, the liquid circulates between the feed channel and the pressurized liquid feeding unit, and when the valve mechanism is in an open state, the pressurized liquid is fed through the feed channel into the preform.

8 Claims, 13 Drawing Sheets

(51) Int. Cl.
*B29C 49/06* (2006.01)
*B29C 49/12* (2006.01)
*B29C 49/46* (2006.01)

(52) U.S. Cl.
CPC .. *B29C 2049/1242* (2013.01); *B29C 2049/465* (2013.01); *B29C 2049/5803* (2013.01); *B29C 2049/5858* (2013.01)

(56) References Cited

U.S. PATENT DOCUMENTS

| | | | |
|---|---|---|---|
| 8,714,964 B2 * | 5/2014 | Lisch et al. | 425/524 |
| 8,740,609 B2 * | 6/2014 | Andison et al. | 425/524 |
| 2008/0213423 A1 | 9/2008 | Leblond et al. | |
| 2010/0225031 A1 | 9/2010 | Andison et al. | |
| 2011/0268855 A1 * | 11/2011 | Chauvin et al. | 426/407 |
| 2013/0180219 A1 * | 7/2013 | Chauvin et al. | 53/559 |

FOREIGN PATENT DOCUMENTS

| | | |
|---|---|---|
| JP | A-56-13142 | 2/1981 |
| JP | A-2000-043129 | 2/2000 |
| JP | A-2003-251685 | 9/2003 |
| JP | A-2008-546569 | 12/2008 |
| JP | A-2011-506130 | 3/2011 |
| JP | A-2011-527246 | 10/2011 |

* cited by examiner

BLOW MOLDING DEVICE

TECHNICAL FIELD

The present invention relates to a synthetic resin preform blow molding device that uses a liquid as a pressurized fluid.

BACKGROUND ART

Blow molding bottles made of polyethylene naphthalate (PET) resin (i.e. plastic bottles) have many excellent characteristics and therefore are widely used as bottle containers. Such containers are typically molded by injection molding a preform into a bottomed cylindrical shape and then stretch molding the preform to an expanded shape after heating to a temperature at which an expansion effect can be achieved.

In other words, as illustrated in FIG. 12 (corresponding to FIG. 12 of Patent Literature 1), preform 31 heated to a temperature at which an expansion effect is achieved is inserted into a blow mold 101, with a mouth tube section 32 of the preform 31 projecting upwards and with a neck ring 33, circumferentially provided integrally at the lower edge of the outer peripheral surface of the mouth tube section 32, engaged with a neck support flange 103. With a guide tube 110, which is the tip of a blow nozzle 104, being loosely inserted into the mouth tube section 32 of the preform 31, the preform 31 is stretched in the axial direction by a stretching rod 108 inserted through an insertion hole 111 formed by penetrating through the center of the blow nozzle 104 and is stretched in the radial direction by air, which is a pressurized fluid, blown through the insertion hole 111. A bottle 41 is thus molded.

Patent Literature 2 discloses an invention related to a method for blow molding preform using liquid instead of blown air as the pressurized fluid. If the content fluid that is ultimately filled into the product, such as a drink, cosmetic, medicine, or the like, is used as the liquid, then this method for molding allows for omission of the filling step and thus simplifies the production line.

CITATION LIST

Patent Literature

PTL 1: JP 2003-251685 A
PTL 2: JP 2000-43129 A

SUMMARY OF INVENTION

Technical Problem

In the blow molding using a liquid as the pressurized fluid as disclosed in Patent Literature 2, the preform except for the mouth tube section is preheated to a temperature appropriate for blow molding into a stretched shape, the pressurized liquid is fed into the preform, and the preform is stretched into an expanded shape to form the container. In the case of a liquid, however, heat transfer with the preform is greater than when using a gas. Since the temperature of the preform changes greatly due to the temperature of the liquid, the temperature of the liquid fed into the preform needs to be controlled to a high degree of accuracy.

If the temperature of the fed liquid fluctuates, the temperature of the stretching preform changes due to the temperature of the liquid, causing the stretchability to change. Problems may therefore occur, including variation in performance, such as the strength or heat resistance of the container; a failure to obtain sufficient formability; and the like.

FIG. 13 schematically illustrates a conventional blow molding device for blow molding preform using liquid instead of blown air as the pressurized fluid. The main part A of this device includes a mold 1 and a blow nozzle 104. Next to the main part A, a pressurized liquid feeding unit 122 and a liquid circulating unit 123 are provided as accessory equipment for feeding the pressurized fluid.

The pressurized liquid feeding unit 122 is shaped as a plunger pump and uses pressurized fluid Fp that is fed via piping P1 from a pressurizing device 121, such as a pressure pump, a compressor, or the like, as a power source to feed pressured liquid L via piping P2 and an electromagnetic valve V101 through the blow nozzle 104 to inside the preform 31 that is tightly fit onto the tip of the blow nozzle 104, thereby stretching the preform 31 into an expanded shape along the cavity of the mold 1 so as to form the container 41.

While circulating the liquid L via piping R102 and piping R103, or newly replenishing the liquid L from piping R101, the liquid circulating unit 123 feeds the liquid L after adjustment to a predetermined temperature to the pressurized liquid feeding unit 122. As described above, however, since the pressurized liquid L is fed into the preform 31 through the piping P2 and the blow nozzle 104, the temperature thereof ends up changing due to a variety of factors, such as the room temperature at the site where the device is installed, the number of mold shots, and the like. Blow molding includes many steps, such as (1) setting the preform 31 in the mold 1, (2) fitting the blow nozzle 104 onto the mouth tube section 32 of the preform 31, (3) feeding the pressurized liquid L into the preform 31 through the blow nozzle 104 to form the container 41, (4) removing the blow nozzle 104 from the mouth tube section 32 of the preform 31, and (5) opening the mold 1 to extract the container 41. Among these steps, the liquid L is first introduced into the blow nozzle in step (3) and moreover is then immediately ejected either into the preform 31 or the container 41. Therefore, maintaining the liquid L fed into the preform 31 at a constant temperature has been a difficult technical issue in terms of actual production.

Accordingly, in a blow mold device that uses liquid as the pressurized fluid, the technical problem addressed by the present invention is to control, to a high degree of accuracy, the temperature of liquid fed into preform in order to stretch the preform into an expanded shape.

Solution to Problem

The main structure according to the present invention for solving the above problems is a blow molding device comprising a mold for blow molding; a blow nozzle to be inserted tightly into a mouth tube section of preform in a bottomed cylindrical shape when the preform is inserted into the mold; a pressurized liquid feeding unit, the blow molding device feeding a pressurized liquid from the pressurized liquid feeding unit into the preform through the blow nozzle to form a container into an expanded shape along a cavity of the mold; and a valve mechanism, provided at a downstream end of a feed channel for the liquid in the blow nozzle, configured to open and close the feed channel so that when the valve mechanism is in a closed state, the liquid circulates between the feed channel and the pressurized liquid feeding unit, and when the valve mechanism is in an open state, the pressurized liquid is fed through the feed channel into the preform.

According to the device with the above structure, among all of the steps for blow molding from the step to set the preform into the mold through the step to remove the molded container from the mold, the liquid used as the pressurized fluid can be circulated, continually or as necessary, between the feed channel and the pressurized liquid feeding unit and adjusted to a predetermined temperature, except during the step to feed the pressurized liquid into the preform through the feed channel to form the container. Therefore, the temperature of the liquid fed into the preform in order to form the container can be controlled to a high degree of accuracy, the container can be formed stably under a constant temperature condition, and the above-described problems including variation in performance, such as the strength or heat resistance of the container; a failure to obtain sufficient formability; and the like can effectively be solved without impairing productivity.

By providing the valve mechanism at the downstream end of the feed channel that is formed in the blow nozzle and communicates with the inside of the preform, the majority of the liquid remaining in the feed channel can be circulated, and the temperature of the liquid can be adjusted, allowing for the temperature of the liquid to be maintained at a predetermined temperature to a high degree of accuracy.

Another structure according to the present invention is the above-described main structure, further comprising a liquid circulating unit configured to adjust the liquid to a predetermined temperature and feed the liquid to the pressurized liquid feeding unit, wherein the feed channel communicates in an openable and closable manner with the pressurized liquid feeding unit via an introductory passage provided in the blow nozzle at an upstream end of the feed channel and communicates in an openable and closable manner with the liquid circulating unit via an exhaust passage provided at a downstream end at a position on an upstream side of the valve mechanism, and the liquid circulates between the feed channel and the pressurized liquid feeding unit via the liquid circulating unit. This structure relates to circulating the liquid between the feed channel and the pressurized liquid feeding unit.

Yet another structure according to the present invention is the above-described main structure, further comprising a rod-shaped seal body inserted into the blow nozzle so as to be displaceable in an axial direction of the blow nozzle, wherein the feed channel is placed in a closed state by abutment of a tip of the seal body against a seal step on an inner circumferential surface of the blow nozzle, and the valve mechanism is configured by abutment and release of abutment of the tip of the seal body against the seal step.

The above structure is related to the valve mechanism that opens and closes the feed channel in the blow nozzle. By displacing the rod-shaped seal body that is inserted into the blow nozzle so as to be displaceable in the axial direction, the feed channel can easily be opened and closed.

Yet another structure according to the present invention is the above-described main structure, wherein the seal body is formed by a cylindrical rod-shaped shaft and a rod inserted slidably into the shaft in a liquid-tight manner.

The rod that is inserted slidably in a liquid-tight manner into the cylindrical rod-shaped shaft can be displaced in a different mode than the displacement of the shaft, and the rod can be used as a member for controlling the headspace to be a predetermined amount in a container in which the liquid, which is used as pressurized fluid for blow molding, is packed into the container as a product during formation of the container. The rod can also be used as a stretching rod for vertically stretching the preform.

Yet another structure according to the present invention is the above-described main structure, wherein the rod is a stretching rod that vertically stretches the preform, the cylindrical rod-shaped shaft is inserted into the blow nozzle in the axial direction, a cylindrical rod guide is connected coaxially to a lower edge of the shaft, the stretching rod is inserted into the connected shaft and rod guide, the stretching rod is inserted into the rod guide slidably in circumferential contact, the shaft, the rod guide, and the stretching rod form the seal body, an inner circumferential surface of the blow nozzle and an outer circumferential surface of the seal body cylindrically form the feed channel for the liquid, when the valve mechanism is in the closed state, the rod guide is inserted in a reduced diameter portion directly below the seal step of the blow nozzle, and when the valve mechanism is in the open state, the rod guide is removed upward from the reduced diameter portion.

According to the device with the above structure, first of all, by inserting the stretching rod slidably in circumferential contact into the rod guide, which is connected to the lower edge of the shaft, it is possible to keep the stretching rod from shaking, i.e. to suppress wobbling due to the gap that needs to be provided between the shaft, for which a metal material is used, and the stretching rod from the perspectives of wear resistance, slipperiness, and the like. The preform can thus be vertically stretched smoothly with the stretching rod. The rod guide can also be formed as a short cylinder, thereby reducing the circumferential contact area with the stretching rod and reducing the sliding resistance of the stretching rod to achieve smooth sliding.

Furthermore, when performing vertical stretching with the valve mechanism in the closed state, the rod guide can be inserted into the reduced diameter portion directly below the seal step, i.e. the rod guide can be supported by the peripheral wall of the reduced diameter portion of the blow nozzle, so that via the rod guide, the function to support the position of the stretching rod with the reduced diameter portion can be sufficiently achieved. This function is coupled with the above-described effect of suppressing the stretching rod from wobbling. The preform can thus be vertically stretched with the stretching rod without wobbling, or uniformly without misalignment.

In the step to stretch the preform into an expanded shape with the pressurized liquid, by placing the valve mechanism in the open state, the rod guide is removed from the reduced diameter portion directly below the seal step, so that the flow channel of the liquid into the preform can be formed by the inner circumferential surface of the blow nozzle and by the outer circumferential surface of the stretching rod. This cylindrical flow channel has no cut-out section and has a sufficient flow channel area, and coupled with the above-described uniform vertical stretchability due to the rod guide, allows for stable, highly productive formation of the container.

If the liquid that is ultimately filled into the product, such as a drink, cosmetic, medicine, or the like, is used as the pressurized liquid ultimately to fill the manufactured product, then at the same time as molding, the headspace in the container filled with the content fluid needs to be controlled to a high degree of accuracy to be a predetermined amount. This headspace is determined by the liquid remaining in the feed channel that flows into the container in an amount corresponding to the portion of the stretching rod that is removed from the mouth tube section in the final step of blow molding. In the above structure, the valve mechanism for suspending the feeding of the liquid is provided in the blow nozzle. Therefore, the valve mechanism can be provided directly above the mouth tube section of the preform, and it is possible to reduce and to measure, to a high degree of accuracy, the amount of liquid remaining in the feed channel portion from directly below the valve mechanism to the upper edge of the mouth tube section of the preform, thus allowing for control of the headspace to a higher degree of accuracy.

Another structure according to the present invention is the above-described main structure, wherein the rod guide is made from polyether ether ketone (PEEK) resin.

The rod guide achieves the function of suppressing the stretching rod from wobbling, and since the stretching rod, which uses metal, is inserted in a state of circumferential contact and repeatedly slid at high speed, the rod guide is a member for which heat resistance, durability, wear resistance, and slipperiness are sought. Among engineering plastics or super engineering plastics, an appropriate plastic can be selected, taking into consideration food sanitation and the like in accordance with use. Among these, PEEK resin is a super engineering plastic that can sufficiently achieve these properties and is a suitable material for the rod guide. Examples of other suitable materials for the rod guide include the engineering plastics polyamide resin, polyacetal resin, polybutyrene terephthalate resin, and the like, and the super engineering plastics polysulfone (PSF) resin, polyimide (PI) resin, polyphenylenesulfide (PPS) resin, and the like.

Yet another structure according to the present invention is the above-described main structure, further comprising a short cylindrical seal tube having a larger diameter than the shaft fit coaxially onto the lower edge of the shaft, wherein a peripheral edge of the seal tube abuts against the seal step, and the rod guide is connected to a lower edge of the seal tube and has a smaller diameter than the seal tube.

According to the above structure, by fitting the short cylindrical seal tube having a larger diameter than the shaft coaxially onto the lower edge of the shaft, the diameter of the lower edge of the shaft can be adjusted to be larger, increasing the degree of freedom for designing the structure of the valve mechanism with the seal body. The seal function can thus be achieved sufficiently. By increasing the diameter of the lower edge of the shaft, the diameter of the rod guide can be correspondingly increased, as can the diameter of the reduced diameter portion. The degree of freedom for designing the flow channel for the liquid in accordance with the purpose of use can thus be greatly increased.

Yet another structure according to the present invention is the above-described main structure, further comprising an insertion tube to be inserted into the mouth tube section of the preform at a lower edge of the blow nozzle, wherein a circumferential step that reduces in diameter towards the tip is provided on an outer peripheral wall of the insertion tube, and by abutment of the circumferential step against an upper edge surface of the mouth tube section with a seal member therebetween, the blow nozzle and the mouth tube section communicate closely.

The above structure is related to a sealing method for the blow nozzle to communicate closely with the mouth tube section. This structure allows for seal properties to be maintained reliably with a simple structure, achieves both high speed insertion into and removal from the preform, and furthermore allows for easy maintenance including replacement of the seal member. Of course, the above structure related to a sealing method is only an example, and an appropriate sealing method may be adopted taking into consideration sealing properties, productivity, and the like.

Advantageous Effect of Invention

A blow molding device according to the present invention has the above-described structure, and according to a device having the main structure of the present invention, among all of the steps for blow molding from the step to set the preform into the mold through the step to remove the molded container from the mold, the liquid used as the pressurized fluid can be circulated, continually or as necessary, between the feed channel and the pressurized liquid feeding unit and adjusted to a predetermined temperature, except during the step to feed the pressurized liquid into the preform through the feed channel to form the container. Therefore, the temperature of the liquid fed into the preform in order to form the container can be controlled to a high degree of accuracy, the container can be formed stably under a constant temperature condition, and problems including variation in performance, such as the strength or heat resistance of the container; a failure to obtain sufficient formability; and the like can effectively be solved without impairing productivity.

DESCRIPTION OF EMBODIMENTS

Figure 1:
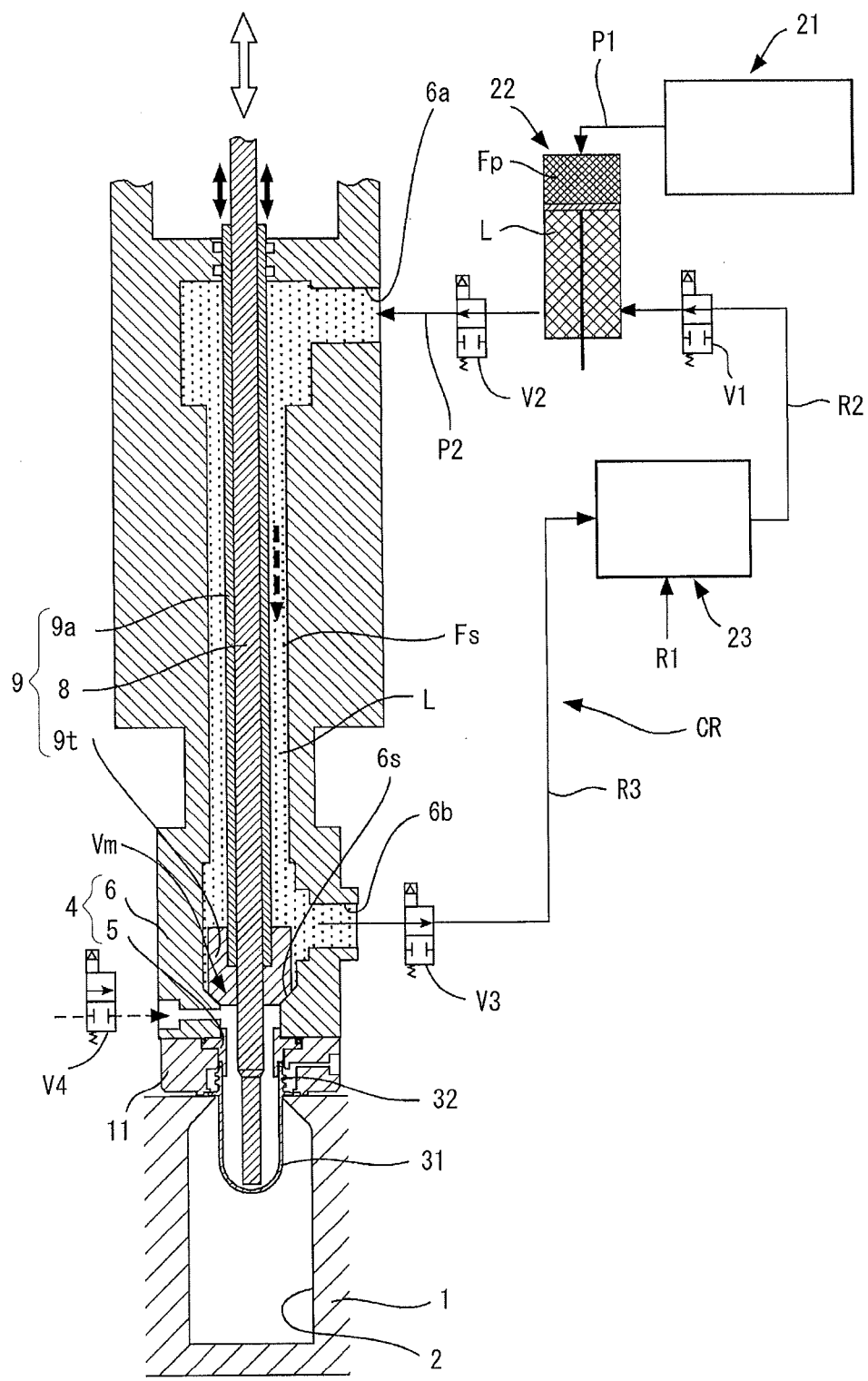
FIG. 1 schematically illustrates an example of the overall structure of the blow molding device in Embodiment 1 of the present invention.
Figure 2:
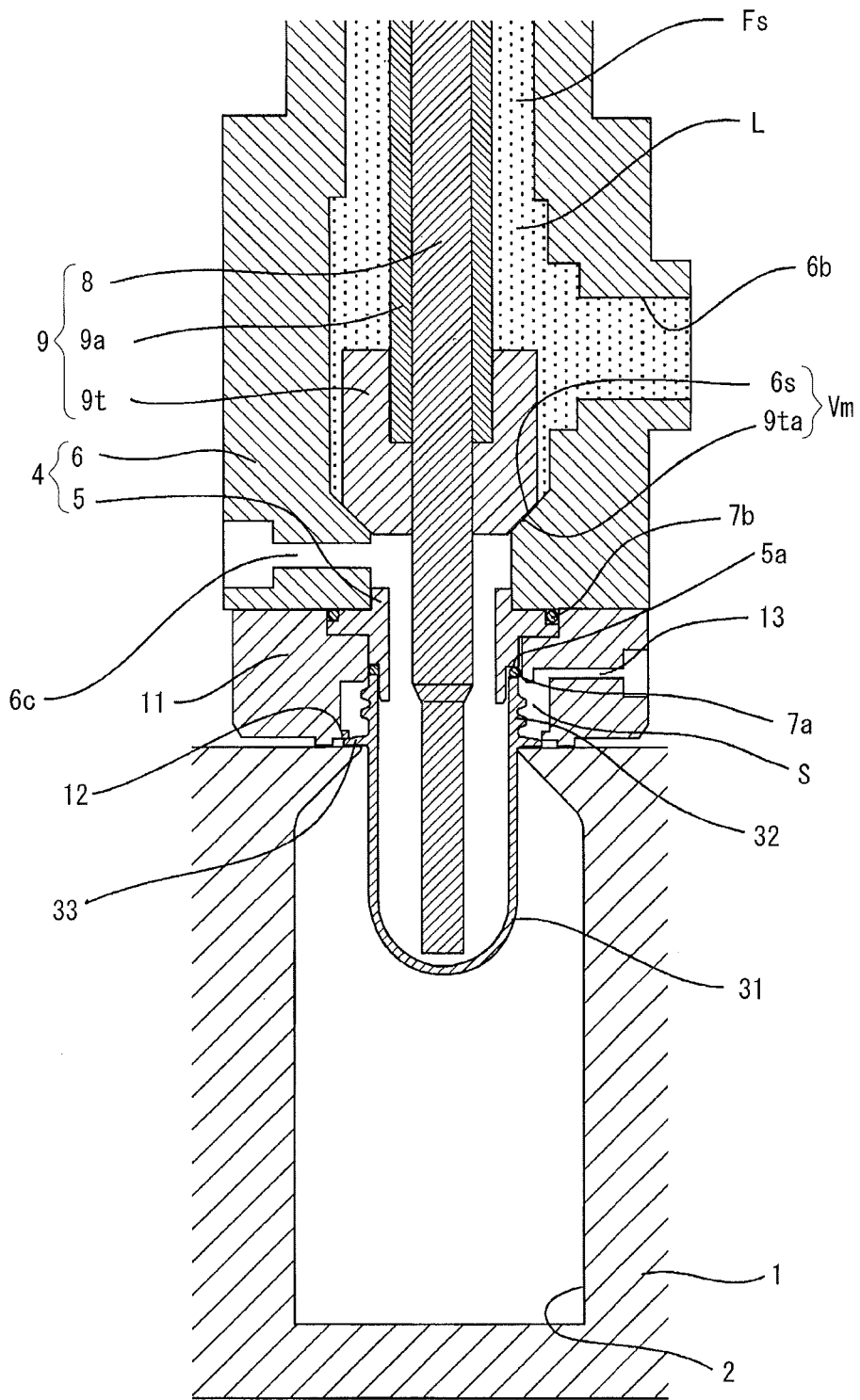
FIG. 2 is a cross-sectional diagram showing an enlargement of the bottom half of the main portion of the device in FIG. 1.

With reference to the drawings, Embodiment 1 of the present invention is now described with an example. FIGS. 1 to 4 illustrate an example of a blow molding device according to the present invention as well as a method for blow molding using this device. First, the overall structure of the device is described with reference to FIGS. 1 and 2. FIG. 1 schematically illustrates an example of the overall structure of a blow molding device of the present invention, and FIG. 2 is a cross-sectional diagram showing an enlargement of the bottom half of the main portion of the device illustrated by the vertical cross-section in FIG. 1. Detailed components in the main portion are described with reference to FIG. 2.

FIG. 1 illustrates a state in which preform 31 is inserted in a mold 1, and the tip of a blow nozzle 4 is inserted into a mouth tube section 32 of the preform 31. The preform 31 that is used is in the overall shape of a bottomed cylindrical test tube, with the mouth tube section 32 provided upright at the upper edge. A neck ring 33 is provided at the lower edge of the mouth tube section 32, and the preform 31 is inserted into the mold 1 with the mouth tube section 32 projecting outside (upwards in FIGS. 1 and 2).

The main portion of this device includes the mold 1, a partitioning member 11, and the blow nozzle 4. A pressurizing device 21, a pressurized liquid feeding unit 22, and a liquid circulating unit 23 are provided as accessory equipment. As illustrated in FIG. 2, the partitioning member 11 is provided above the mold 1 so as to surround the outer peripheral surface of the mouth tube section 32 of the preform 31, which protrudes above the mold 1, leaving a space S between the mouth tube section 32 and the partitioning member 11. As necessary, an intake hole 13 is provided in the partitioning member 11 to feed pressurized gas to the space S. A support flange 12 circumferentially provided at the lower edge of the partitioning member 11 is abutted closely against the neck ring 33 of the preform 31 from above and holds the preform 31 in the inserted position.

The blow nozzle 4 is cylindrical overall and is formed by a insertion tube 5 and a feed tube 6 that are connected tightly by a seal member 7b. The insertion tube 5 has a columnar cavity therein, and as illustrated in FIG. 2, a circumferential step 5a that reduces in diameter towards the tip is provided on the outer peripheral wall. The cylindrical tip is inserted into the mouth tube section 32 of the preform 31, and by abutment of the circumferential step 5a against the upper edge surface of the mouth tube section 32 with a seal member (O ring) 7a therebetween, the blow nozzle 4 and the mouth tube section 32 are connected tightly in a communicating state.

The feed tube 6 is a member that overall has a columnar cavity therein, and as illustrated in FIG. 1, an introduction passage 6a for liquid L is provided at the upper edge, penetrating through the peripheral wall. An exhaust passage 6b for the liquid L is provided near the lower edge, similarly penetrating through the peripheral wall. Further below this exhaust passage 6b, a seal step 6s is circumferentially provided on the inner circumferential surface at the lower edge of the feed tube 6. The seal step 6s is inclined so as to reduce in diameter downwards. Below the seal step 6s, an intake hole 6c is provided for communication between the inside and outside of the feed tube 6.

An elongated rod-shaped seal body (seal pin) 9 is provided by being inserted into the blow nozzle 4, formed by the insertion tube 5 and the feed tube 6 as described above, in the axial direction (in the vertical direction in FIG. 1). The seal body 9 is formed by inserting an elongated columnar rod 8 slidably in a liquid-tight manner into an elongated cylindrical rod-shaped shaft 9a. A short cylindrical seal tube 9t is assembled onto the shaft 9a by being fit coaxially onto the tip of the shaft 9a. The outer peripheral edge of the lower edge surface of the seal tube 9t is chamfered to form a tapered edge 9ta.

Figure 3:
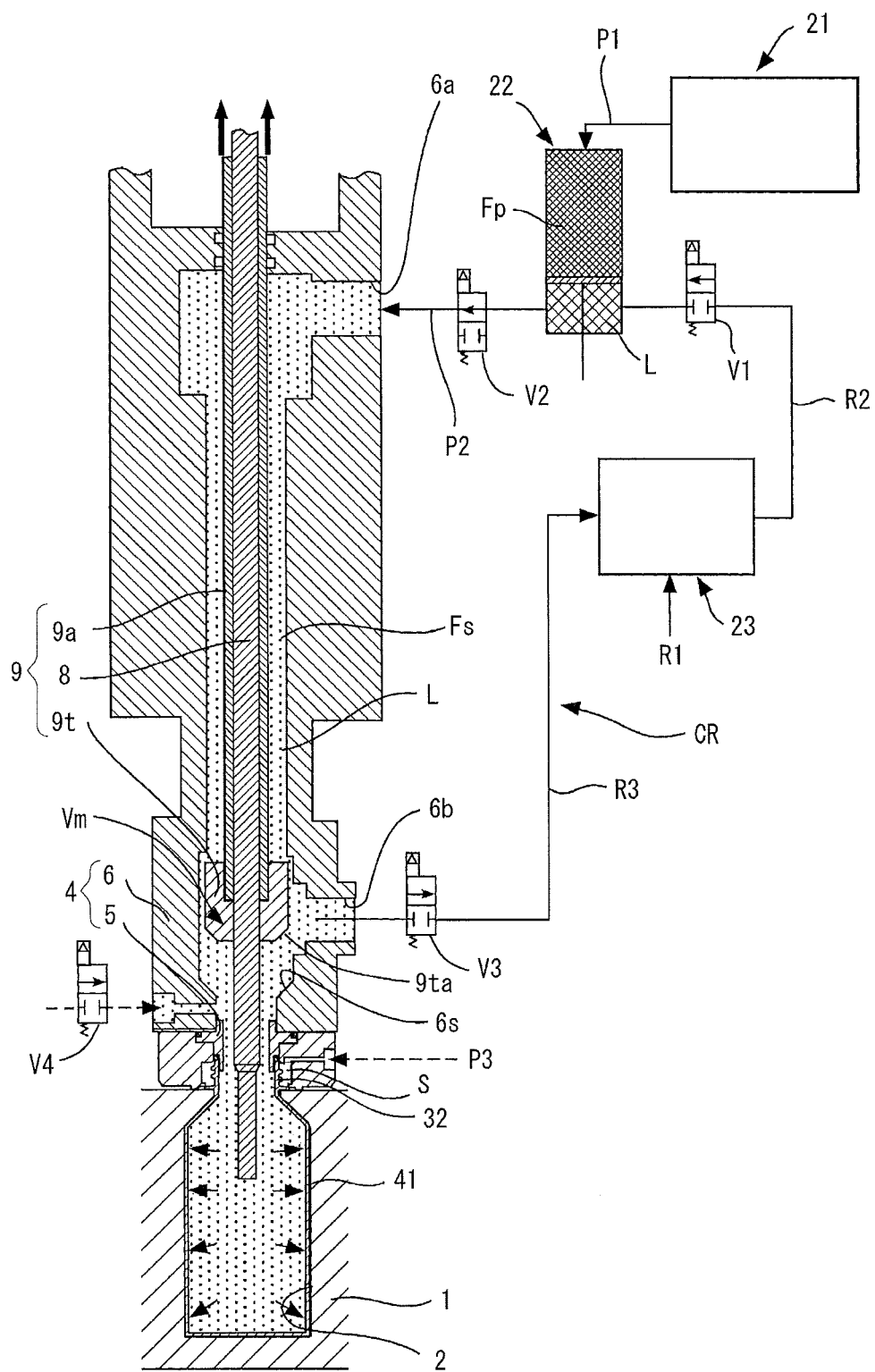
FIG. 3 is a cross-sectional diagram illustrating, among the molding steps by the device in FIG. 1, the state in which the container is formed by stretching preform into an expanded shape using pressurized liquid.

The blow nozzle 4 and the seal body 9 form a cylindrical feed channel Fs in the blow nozzle 4, along the axial direction of the blow nozzle 4, communicating with the inside of the preform 31. By lowering the seal body 9, the tapered edge 9ta of the seal tube 9t abuts against the seal step 6s circumferentially provided on the inner circumferential surface at the lower edge of the feed tube 6, as illustrated in FIGS. 1 and 2, allowing for the communication of the feed channel Fs into the preform to be placed in a closed state. Furthermore, by raising the seal body 9 as illustrated in FIG. 3, the communication may be placed in an open state. Abutment of this tapered edge 9ta against the seal step 6s and release of abutment thus form a valve mechanism Vm. The above-described introduction passage 6a is positioned at an upstream end of the feed channel Fs, whereas the exhaust passage 6b is positioned at the downstream end of the feed channel Fs, immediately upstream of the seal step 6s.

As described below, the rod 8 is for achieving the function of controlling the headspace to be a predetermined amount in a container in which the liquid L, which was used as pressurized fluid for blow molding, was packed into the container as a product during formation of the container. The rod 8 can also be used as a stretching rod for vertically stretching the preform 31.

Next, as accessory equipment, the pressurizing device 21, pressurized liquid feeding unit 22, and liquid circulating unit 23 are provided. The pressurizing device 21 is necessary for conventional blow molding and is a large-scale piece of equipment such as a pressure pump, a compressor, or the like. The pressurized fluid Fp fed from the pressurizing device 21 through the piping P1 becomes the power source of the pressurized liquid feeding unit 22, which is shaped as a plunger pump and feeds the pressurized liquid L. Of course, instead of the illustrated pump shape, such as a plunger, the pressurized liquid feeding unit 22 may, for example, be a cylinder with a piston having two chambers.

The liquid circulating unit 23 adjusts the liquid L to a predetermined temperature while newly replenishing the liquid L from piping R1 and feeds the liquid L to the pressurized liquid feeding unit 22 via piping R2. The liquid circulating unit 23 also has the function of circulating the liquid L between the pressurized liquid feeding unit 22 and the feed channel Fs in the blow nozzle 4 while adjusting the liquid L to a predetermined temperature. In other words, the liquid L can be circulated as needed along a circulation route CR in the order of the feed channel Fs, exhaust passage 6b, piping R3, liquid circulating unit 23, piping R2, pressurized liquid feeding unit 22, piping P2, introduction passage 6a, and feed channel Fs.

A number of valves that open and close the flow channel as necessary throughout the blow molding process are provided in the circulation route CR. In FIG. 1, four electromagnetic valves V1, V2, V3, and V4 are illustrated.

Next, with reference to FIGS. 1 to 4, a method for manufacturing a synthetic resin container using the above-illustrated blow molding device, i.e. a method for blow molding, is described. To accomplish blow molding, steps (1) through (6) below are performed in the order listed.

(1) First, preform 31 except for the mouth tube section 32 thereof is heated to an appropriate temperature for blow molding and is inserted into and clamped on the mold 1 for blow molding, with the mouth tube section 32 protruding upwards.

(2) Next, the securely assembled partitioning member 11 and blow nozzle 4 are lowered from above the mouth tube section 31, and the tip of the insertion tube 5 is inserted into the mouth tube section 32 to reach the state illustrated in FIGS. 1 and 2. The tapered edge 9*ta* of the seal tube 9*t*, which forms the tip of the seal body 9, is abutted against the seal step 6*s* of the feed tube 6 to place the valve mechanism Vm in a closed state, and then the rod 8 is lowered so that a predetermined length of the tip thereof is inserted into the preform 31. The valves V1, V2, and V3 are all in the open state, and the liquid L circulates along the above-described circulation route CR while the temperature thereof is adjusted by the liquid circulating unit 23.

(3) Next, from the state in FIG. 1, as illustrated in FIG. 3 the seal tube 9*t* is raised along with the shaft 9*a* forming the seal body 9 to place the valve mechanism Vm in an open state, the valves V1, V2, and V3 are placed in a closed state, and circulation of the liquid L along the circulation route CR is suspended. The pressurizing function of the pressurized liquid feeding unit 22 is caused to operate, and pressurized liquid L is fed through the feed channel Fs via the mouth tube section 32 into the preform 31. The preform 31 is stretched into an expanded shape, and the container 41 is formed along the cavity 2 of the mold 1. In this step, when the mouth tube section 32 expands in diameter due to pressure of the liquid L, such expansion in diameter can effectively be suppressed by introducing a pressurized gas via piping P3 into the partitioning member 11 from the intake hole 13 provided in the partitioning member 11 and pressurizing the space S surrounding the outer peripheral surface of the mouth tube section 32.

Figure 4:
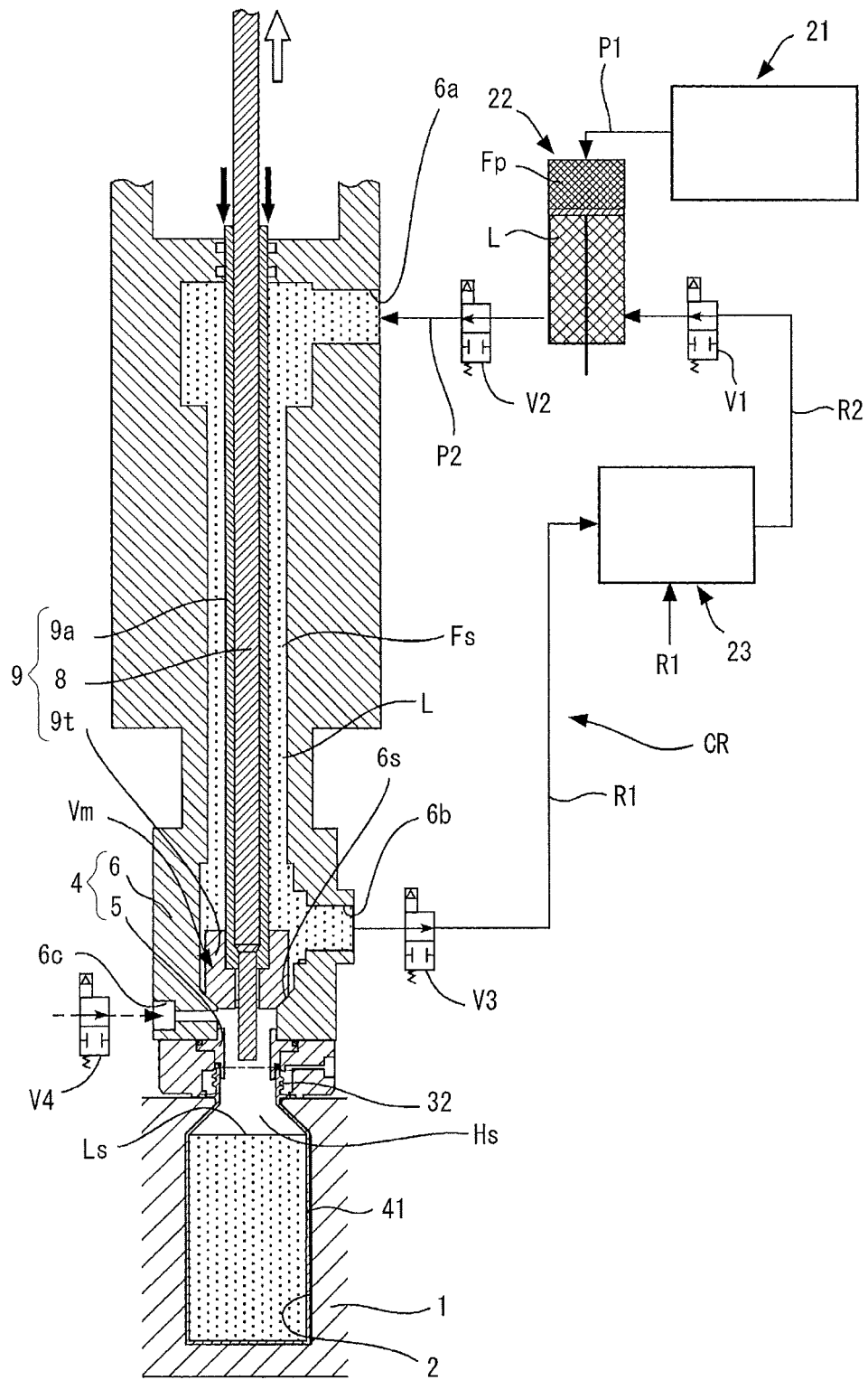
FIG. 4 is a cross-sectional diagram illustrating, among the molding steps by the device in FIG. 1, the state in which the rod has been removed from the state in FIG. 3.

(4) Next, after the container 41 is formed as described above, the shaft 9*a* is lowered as illustrated in FIG. 4 to place the valve mechanism Vm in a closed state, the valves V1, V2, and V3 are placed in an open state, and the liquid L is once again circulated along the circulation route CR.

(5) At the same time as step (4), or slightly thereafter, the tip of the rod 8 is removed from the container 41, as illustrated in FIG. 4. Along with removal of the tip of the rod 8, all of the liquid L remaining in the feed channel Fs below the valve mechanism Vm flows into the container 41. The liquid surface Ls in the container 41 then lowers, allowing for adjustment to a predetermined headspace Hs set in advance, as illustrated in FIG. 4. Furthermore, at the time of removal of the tip of the rod 8, when the container 41 enters a decompressed state, causing the container 41 to deform by reducing in volume, then the decompressed state in the container 41 can be relieved by using the valve V4 to place the intake hole 6*c* provided in the feed tube 6 of the blow nozzle 4 in an open state, thereby effectively preventing such deformation of the container 41.

(6) While omitted from the drawings, the blow nozzle 4 and the mouth tube section 31 of the container 41 are then removed, the mold 1 is opened, the container 41 filled with the liquid L is extracted, and the mouth tube section 32 is sealed with a cap to yield the final product.

In the above-described blow device, or method for molding using this device, an example has been described of forming and molding the container 41 by stretching the preform 31 into an expanded shape with pressurized liquid L. Alternatively, however, the rod 8 may be used as a stretching rod to vertically stretch the preform 31, and so-called two-axis stretching blow molding may be performed by both vertically stretching with this rod 8 and stretching into an expanded shape with the pressurized liquid L.

Next, with reference to the drawings, Embodiment 2 of the present invention is described with an example.

FIGS. 5 to 11 are for describing the blow molding device according to Embodiment 2 of the present invention and a method for manufacturing a synthetic resin container using this device. Mainly using FIGS. 5 and 6, an example of the overall structure of the blow molding device according to Embodiment 2 of the present invention is described below, and using FIGS. 5 to 10, an example of a method for manufacturing a synthetic resin container using this device is described, i.e. an example of the steps in a method for blow molding using a liquid as a pressure medium. Note that in FIGS. 5 to 11, the same reference signs are used for components corresponding to previously described components, and repetitive descriptions are omitted.

Figure 5:
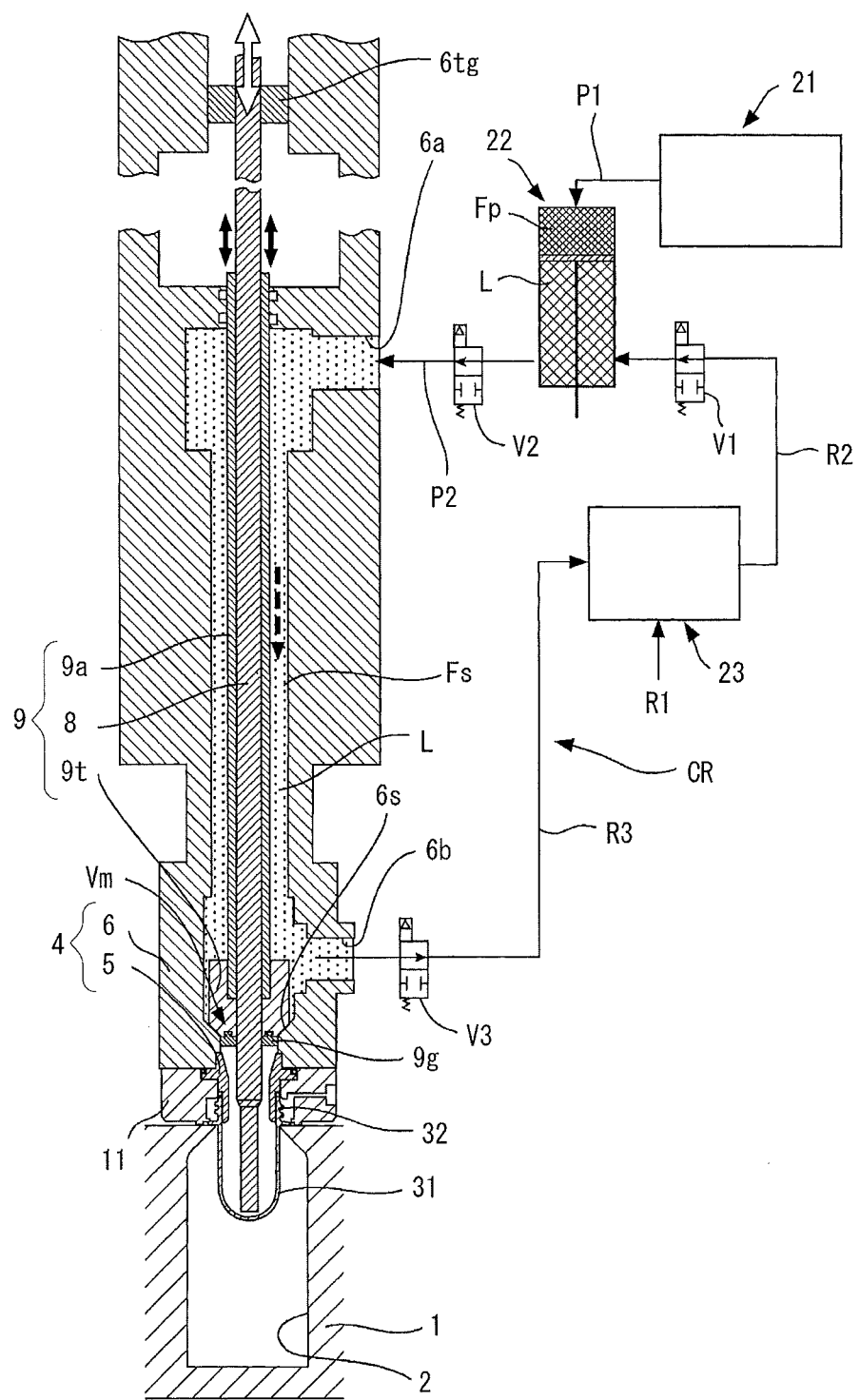
FIG. 5 illustrates an example of the overall structure of the blow molding device in Embodiment 2 of the present invention.
Figure 6:
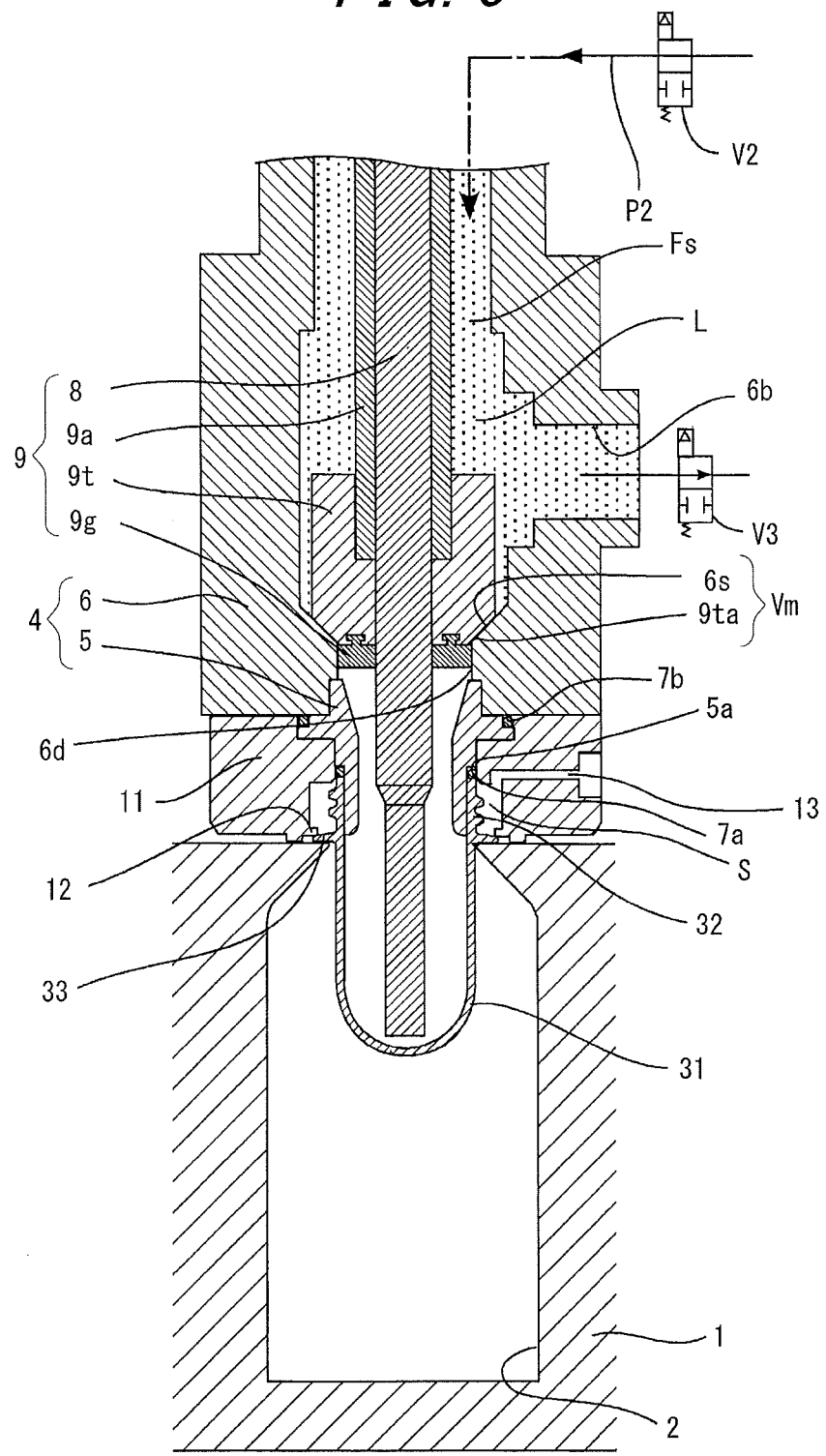
FIG. 6 is a cross-sectional diagram showing an enlargement of the bottom half of the main portion of the device in FIG. 5.

As illustrated in FIGS. 5 and 6, in the present embodiment, the upper part of the insertion tube 5 is formed to be a tapered cylinder, and the lower part is formed to be cylindrical. A reduced diameter portion 6*d* with a smaller diameter than the portion directly thereabove is provided directly below the seal step 6*s* of the feed tube 6. Furthermore, the rod 8 is formed as a stretching rod 8.

In the present embodiment, the seal body 9 is formed by inserting the elongated columnar stretching rod 8 into a cylindrical rod guide 9*g* and the elongated cylindrical rod-shaped metallic shaft 9*a*, onto which is assembled the short cylindrical seal tube 9*t* by being fit coaxially onto the lower edge. The rod guide 9*g* is connected coaxially onto the lower edge of the seal tube 9*t*. The lower edge of the shaft 9*a* has the short cylindrical seal tube 9*t* assembled thereon by being fit coaxially.

From the perspectives of wear resistance, slipperiness, and the like, the stretching rod 8 is inserted into the shaft 9*a* with a slight gap therebetween. On the other hand, the rod guide 9*g* is configured so that the stretching rod 8 is inserted slidably in a state of circumferential contact. The stretching rod 8 is inserted at the upper edge of the feed tube 6 into a top rod guide 6*tg* slidably in a state of circumferential contact (see FIG. 5).

The rod guide 9*g* is disposed to allow for slidable insertion into and removal from the reduced diameter portion 6*d*.

Here, the rod guide 9*g* is a member into which the stretching rod 8 is inserted in a state of circumferential contact and repeatedly slid at high speed, and for which sliding insertion or removal operations are repeated at high speed in a state of circumferential contact with the reduced diameter portion 6*d*. In the present example, from the perspectives of heat resistance, durability, wear resistance, and slipperiness, the rod guide 9*g* is made from polyether ether ketone (PEEK) resin. Of course, considering use conditions and the like, an appropriate synthetic resin may be selected from among other engineering plastics or super engineering plastics. Note that the seal tube 9*t* and the rod guide 9*g* can be firmly joined in an undercut shape by injection molding the rod guide 9*g* with the seal tube 9*t* as an insert material.

In the closed state of the valve mechanism Vm, the rod guide 9*g* is inserted in the reduced diameter portion 6*d* directly below the seal step 6*s* of the nozzle guide 4, whereas in the open state of the valve mechanism Vm, the rod guide 9*g* is removed upward from the reduced diameter portion 6*d*, thereby opening the flow channel of the liquid L.

As described above, both the stretching rod 8 and the shaft 9*a* are components using metal. To prevent wear of these components, and for smooth relative motion of these components, the stretching rod 8 is inserted into the shaft 9*a*, which includes the seal tube 9*t*, so as to allow for a slight gap. During the vertical stretching step, there is a risk of the stretching rod 8 wobbling.

Figure 8:
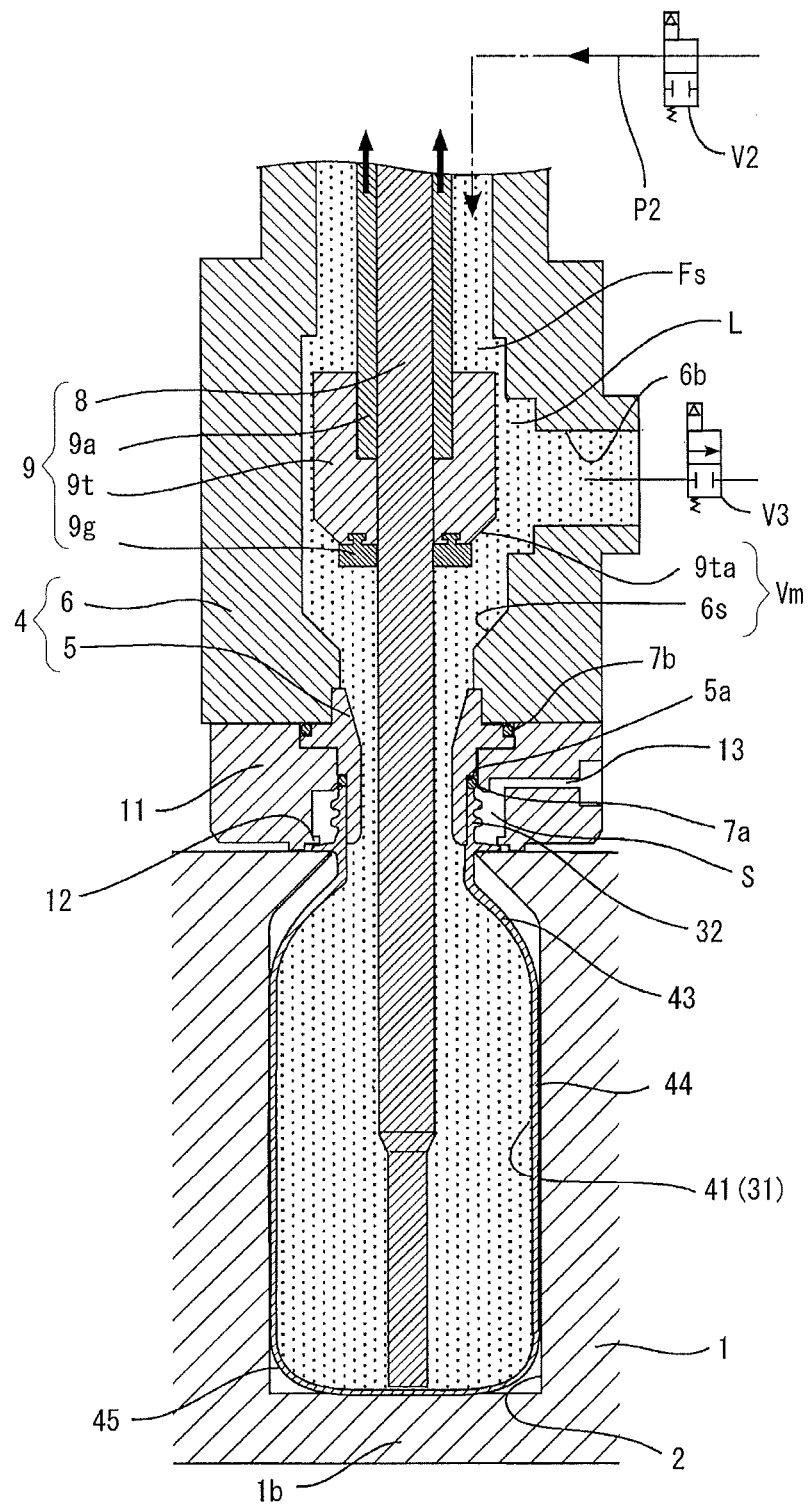
FIG. 8 is a cross-sectional diagram illustrating, among the molding steps by the device in FIG. 5, the state immediately before formation of the container is complete in the step to stretch the preform into an expanded shape using pressurized liquid from the state FIG. 7.

With respect to this point, in the structure of the present embodiment, the stretching rod 8 is inserted slidably into the rod guide 9g in a state of circumferential contact. As illustrated in FIG. 8, even when the valve mechanism Vm is in an open state and the rod guide 9g is removed upward from the reduced diameter portion 6d, so that the reduced diameter portion 6d no longer supports the rod guide 9g, the stretching rod 8 can still at least be suppressed from wobbling due to the gap between the stretching rod 8 and the shaft 9a that includes the seal tube 9t.

Furthermore, when performing vertical stretching with the valve mechanism Vm in the closed state, the rod guide 9g can be inserted into the reduced diameter portion 6d directly below the seal step 6s, i.e. the rod guide 9g can be supported by the peripheral wall of the reduced diameter portion 6d in the blow nozzle 4. Via the rod guide 9g, the function to support the position of the stretching rod 8 with the reduced diameter portion 6d is sufficiently achieved, and this function is coupled with the above-described effect of the rod guide 9g suppressing the stretching rod 8 from wobbling. The preform can thus be vertically stretched with the stretching rod 8 without wobbling, or uniformly without misalignment.

Next, with reference to FIGS. 5 to 10, an example of the steps for blow molding a synthetic resin container using the above-illustrated blow molding device of Embodiment 2 is described. Among FIGS. 5 to 10, FIGS. 6, 7, and 8 are cross-sectional diagrams showing an enlargement of the bottom half of the main portion of the device. To accomplish blow molding, steps (1) through (7) below are performed in the order listed.

(1) First, preform 31 except for the mouth tube section 32 thereof is heated to an appropriate temperature for blow molding and is inserted into and clamped on the mold 1 for blow molding, with the mouth tube section 32 protruding upwards.

(2) Next, the securely assembled partitioning member 11 and blow nozzle 4 are lowered from above the mouth tube section 32, and the tip of the insertion tube 5 is inserted into the mouth tube section 32 to reach the state illustrated in FIGS. 5 and 6.

The tapered edge 9ta of the seal tube 9t forming the lower edge of the seal body 9 abuts against the seal step 6s of the feed tube 6, and the valve mechanism Vm is in the closed state. Furthermore, the stretching rod 8 is inserted into the preform 31. In this state, the rod guide 9g is inserted into the reduced diameter portion 6d directly below the seal step 6s of the nozzle guide 4. The valves V1, V2, and V3 are all in the open state, and the liquid L circulates along the above-described circulation route CR while the temperature thereof is adjusted by the liquid circulating unit 23.

Figure 7:
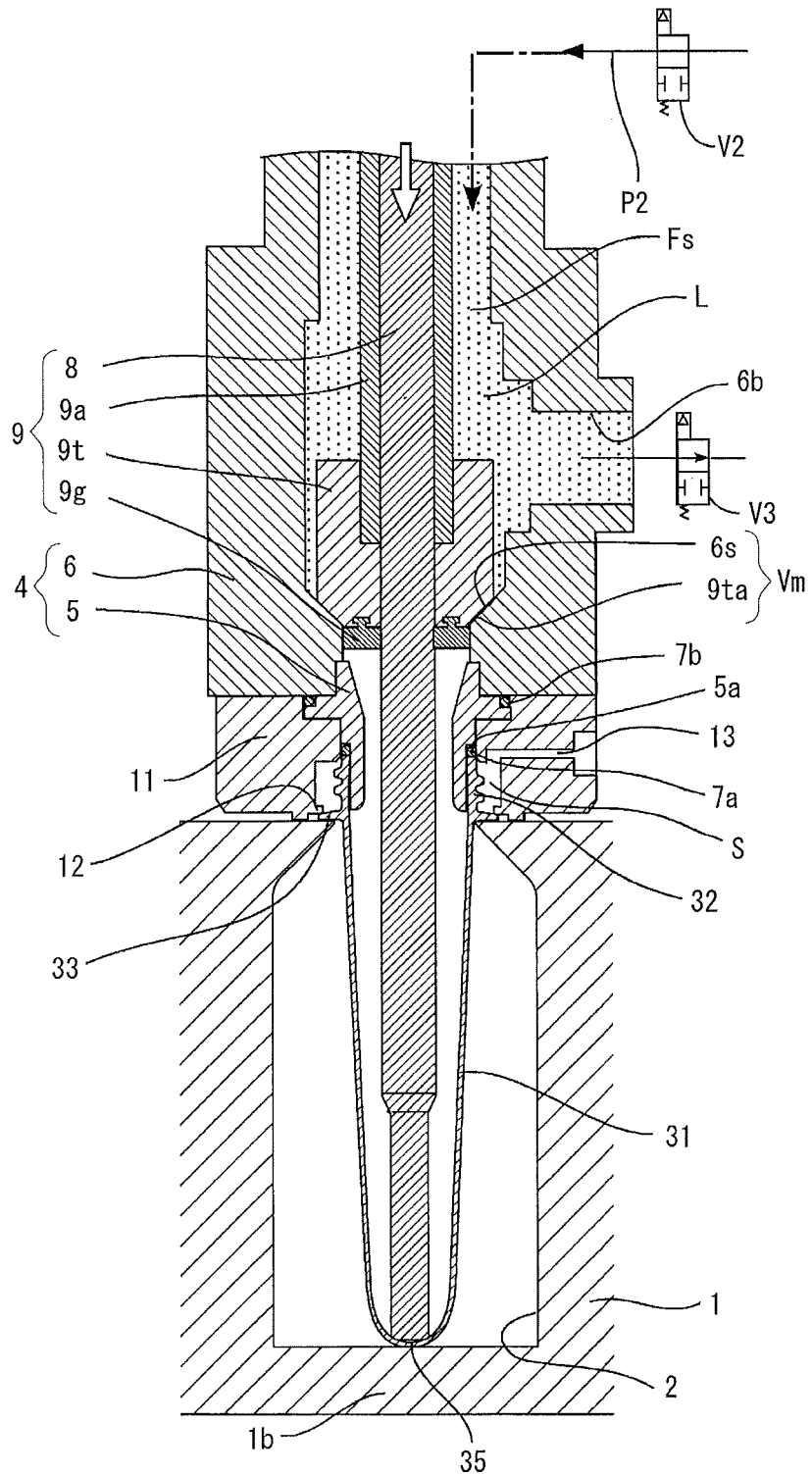
FIG. 7 is a cross-sectional diagram illustrating, among the molding steps by the device in FIG. 5, the state in which preform has been vertically stretched with a stretching rod from the state in FIG. 6.

(3) Next, from the state in FIG. 6, the preform 31 is vertically stretched by the stretching rod 8, and the central region of a bottom wall 35 of the preform 31 is sandwiched between the lower edge of the stretching rod 8 and a bottom wall 1b of the mold 1, as illustrated in FIG. 7. During this vertical stretching step, the position of the stretching rod 8 is more reliably supported by the top rod guide 6tg positioned at the top and by the rod guide 9g, which is supported by the reduced diameter portion 6d. The preform 31 can thus be vertically stretched uniformly in a state without the stretching rod 8 wobbling or becoming misaligned.

In the present embodiment, the bottom wall 35 of the preform 31 is vertically stretched by the stretching rod 8 until abutting against the bottom wall 1b of the mold. Taking into consideration factors such as the productivity of the blow molding and the thickness distribution of the molded container, however, a structure may be adopted to vertically stretch the preform 31 to an intermediate height.

(4) Next, from the state in FIG. 7, by raising the shaft 9a, which forms the seal body 9, to place the valve mechanism Vm in the open state, as illustrated in FIG. 8, the rod guide 9g is removed from the reduced diameter portion 6d so that the flow channel of the liquid L into the preform 31 can be formed by the inner circumferential surface of the feed tube 6 and the insertion tube 5 in the blow nozzle 4 and by the outer circumferential surface of the stretching rod 8. This flow channel is formed as a cylindrical, smooth flow channel having a sufficient flow channel area. The valve V3 is then placed in the closed state, as is the valve V1, and the pressurized liquid L from the pressurized liquid feeding unit 22 is fed into the preform 31 from the mouth tube section 32 through the feed channel Fs in the blow nozzle 4. The container 41 is thus stretched into an expanded shape along the cavity 2 of the mold 1 so as to form the container 41.

In the state in FIG. 8, the container 41 is in a state immediately before formation is complete, as shown by the gaps with the surface of the cavity 2 near the shoulder 43 and the bottom 45. In this state, the peripheral wall of the body 44 is in light contact with the surface of the cavity 2.

Figure 13A:
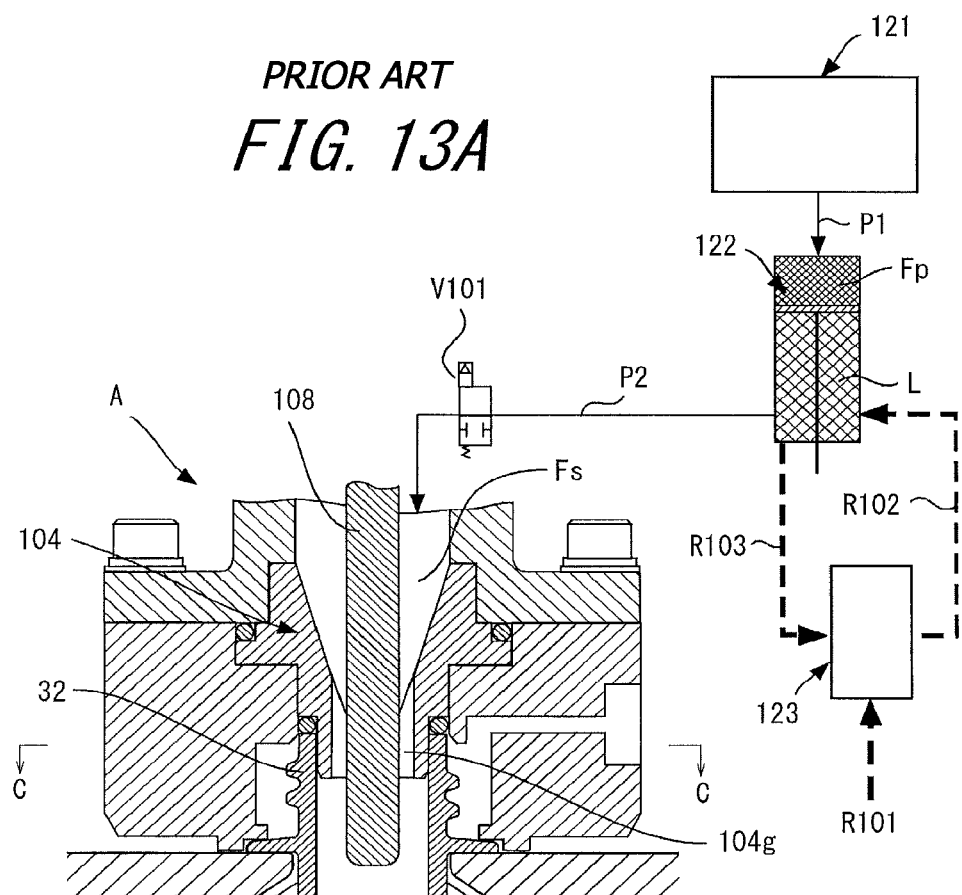
FIG. 13(a) schematically illustrates a conventional example of a blow molding device using pressurized liquid.
Figure 13B:
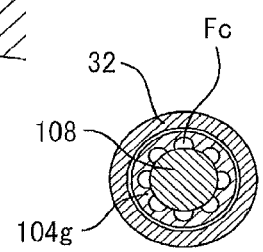
FIG. 13(b) is a top cross-sectional view of a rod guide along the C-C line in FIG. 13(a).

As described above, in the device of the present embodiment, the feed channel of the liquid L into the preform 31 can be formed as a cylindrical, smooth flow channel having a sufficient flow channel area, and as compared to a conventional device, the pressure rising time inside the preform due to the pressurized liquid L can be shortened, so that the production rate can be increased. With the above-described blow molding steps using the molding device in FIG. 5, the pressure rising time of the preform 31 with the pressurized liquid L is 334.23 msec. It was thus confirmed that the pressure rising time can be greatly reduced as compared to the time of 433.17 msec for the case of disposing a guide rod 104g, in which the flow channel Fc is formed by being cut out, inside the mouth tube section 32 of the preform 31, as illustrated in FIG. 13. By being cylindrical and smooth, with no cut-out section, this flow channel also solves problems related to the occurrence of bubbles.

Figure 9:
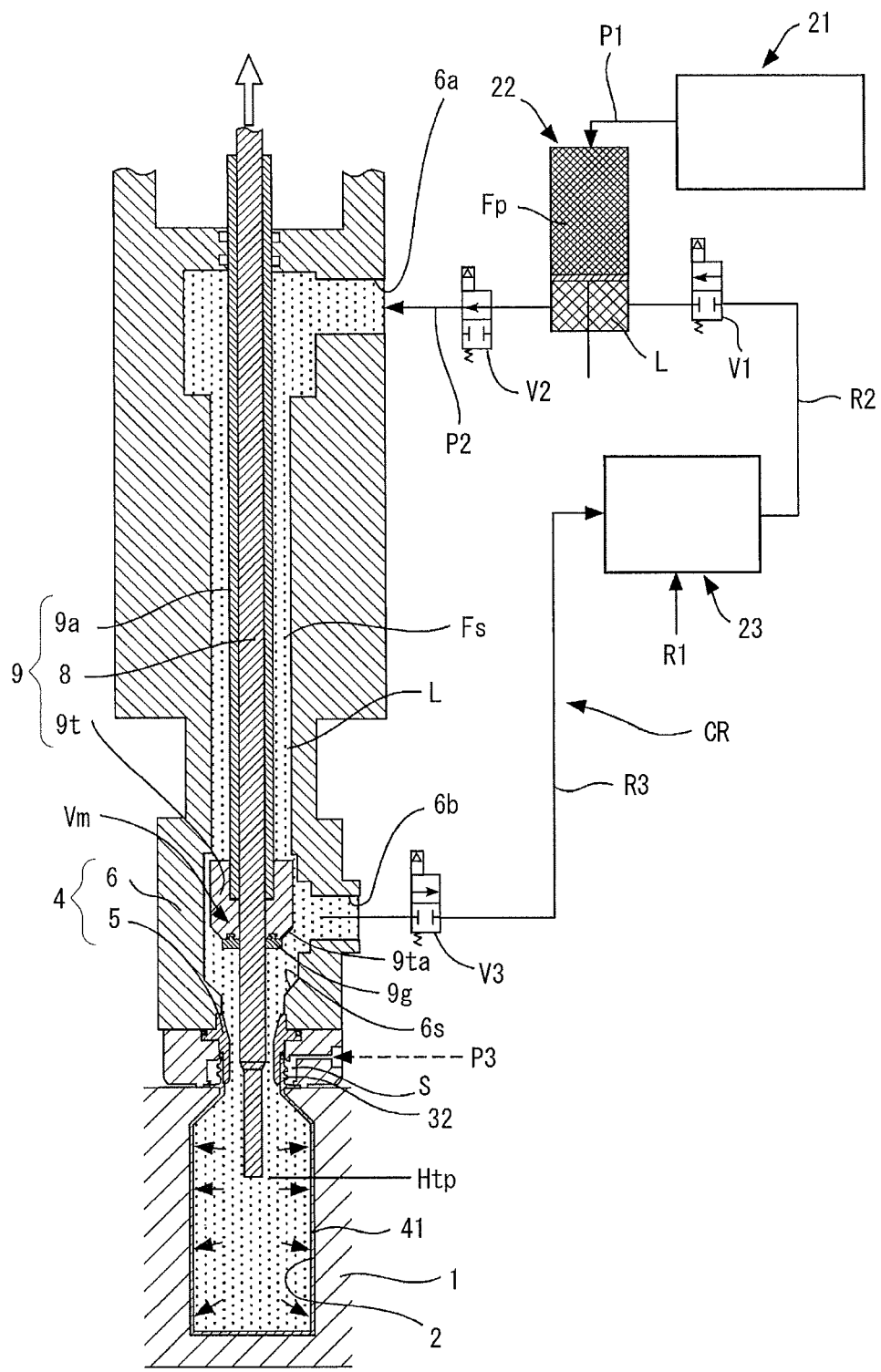
FIG. 9 is a cross-sectional diagram illustrating, among the molding steps by the device in FIG. 5, the state in which formation of the container is complete, with the stretching rod having been withdrawn to a predetermined height from the state in FIG. 8.

(5) Next, the pressured liquid L is fully injected, and at a predetermined timing before formation of the container 41 is complete (in the state in FIG. 8), the stretching rod 8 is withdrawn so that the tip thereof is at a predetermined height position Htp inside the container 41, as illustrated in FIG. 9.

As the stretching rod 8 is withdrawn, the container 41 is filled with an amount of the pressured liquid L corresponding to the raising of the stretching rod 8. Hence, while preventing a volume-reducing deformation of the container 41 as a result of withdrawing the stretching rod 8, formation of the container 41 along the cavity 2 of the mold 1 is completed as illustrated in FIG. 9, and furthermore the peripheral wall of the container 41 is pressed against the surface of the cavity 2 by the pressurized liquid L, allowing for preservation of pressure and for cooling.

Figure 10:
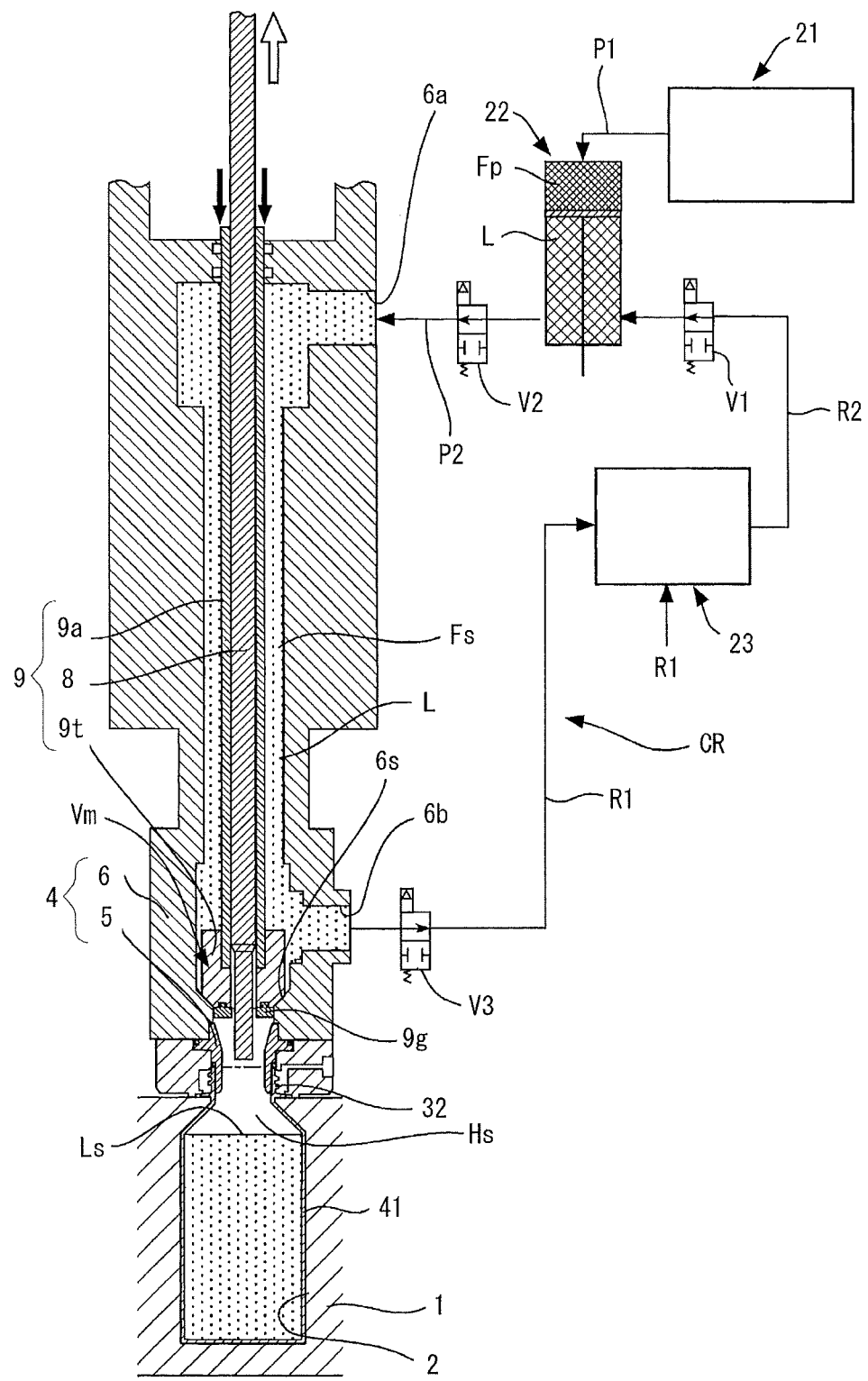
FIG. 10 is a cross-sectional diagram illustrating, among the molding steps by the device in FIG. 5, the state in which the stretching rod has been removed from the container from the state in FIG. 9.

(6) Next, at a predetermined timing after withdrawal of the stretching rod 8, from the state in FIG. 9 the shaft 9a is lowered, the feed channel Fs is placed in the closed state by the valve mechanism Vm, and the stretching rod 8 is removed from the container 41, as illustrated in FIG. 10. At this point, the valve V3 is in the open state, and the liquid L is once again circulated along the circulation route CR. Also, along with removal of the stretching rod 8, all of the liquid L remaining in the feed channel Fs below the valve mechanism Vm flows into the container 41. The liquid surface Ls in the container 41 then lowers, allowing for adjustment to a predetermined headspace Hs set in advance, as illustrated in FIG. 10.

In the present embodiment, the valve mechanism Vm for suspending the feeding of the liquid L is provided near the lower edge of the blow nozzle 4. Therefore, it is possible to reduce and to measure, to a high degree of accuracy, the amount of liquid L remaining in the feed channel Fs portion from the position at which the valve mechanism Vm is provided to the upper edge of the mouth tube section of the preform, thus allowing for control of the headspace Hs to a higher degree of accuracy. By contrast, with the conventional device illustrated in FIG. 13, feeding of the liquid L is suspended by the valve V101 provided on the outside of the blow nozzle 104, making it difficult to control the headspace to a high degree of accuracy.

(7) While omitted from the drawings, the blow nozzle 4 and the mouth tube section 32 of the container 41 are then removed, the mold 1 is opened, the container 41 filled with the liquid L is extracted, and the mouth tube section 32 is sealed with a cap to yield the final product.

Embodiments of a blow molding device according to the present invention have been described with examples, yet the present invention is of course not limited to the above examples. In the above examples, abutment and release of abutment against the seal step 6s of the tapered edge 9ta constitute the valve mechanism Vm, yet taking into consideration seal properties, operability related to opening and closing, and the like, a variety of valve mechanisms may be adopted, for example.

In the example for Embodiment 1, the rod 8 is used to adjust the headspace Hs of the liquid with which the container 41 is filled, yet in accordance with the purpose of use, a structure without the rod 8 may be adopted.

In the example of steps for Embodiment 2, the timing for withdrawing the lower edge of the stretching rod 8 from the position after vertical stretching to the predetermined height position inside the container is immediately before formation of the container 41 is complete, as illustrated in FIG. 8. The timing is not particularly limited, however, and may be a different time, such as during formation of the container by stretching into an expanded shape with the pressurized liquid L, the same time as formation is complete, or a predetermined time after formation is complete, and may be determined appropriately taking into consideration blow moldability, including productivity; whether volume-reducing deformation exists; whether residual strain exists in the molded container; uniformity of the peripheral wall; and other such factors.

Figure 11:
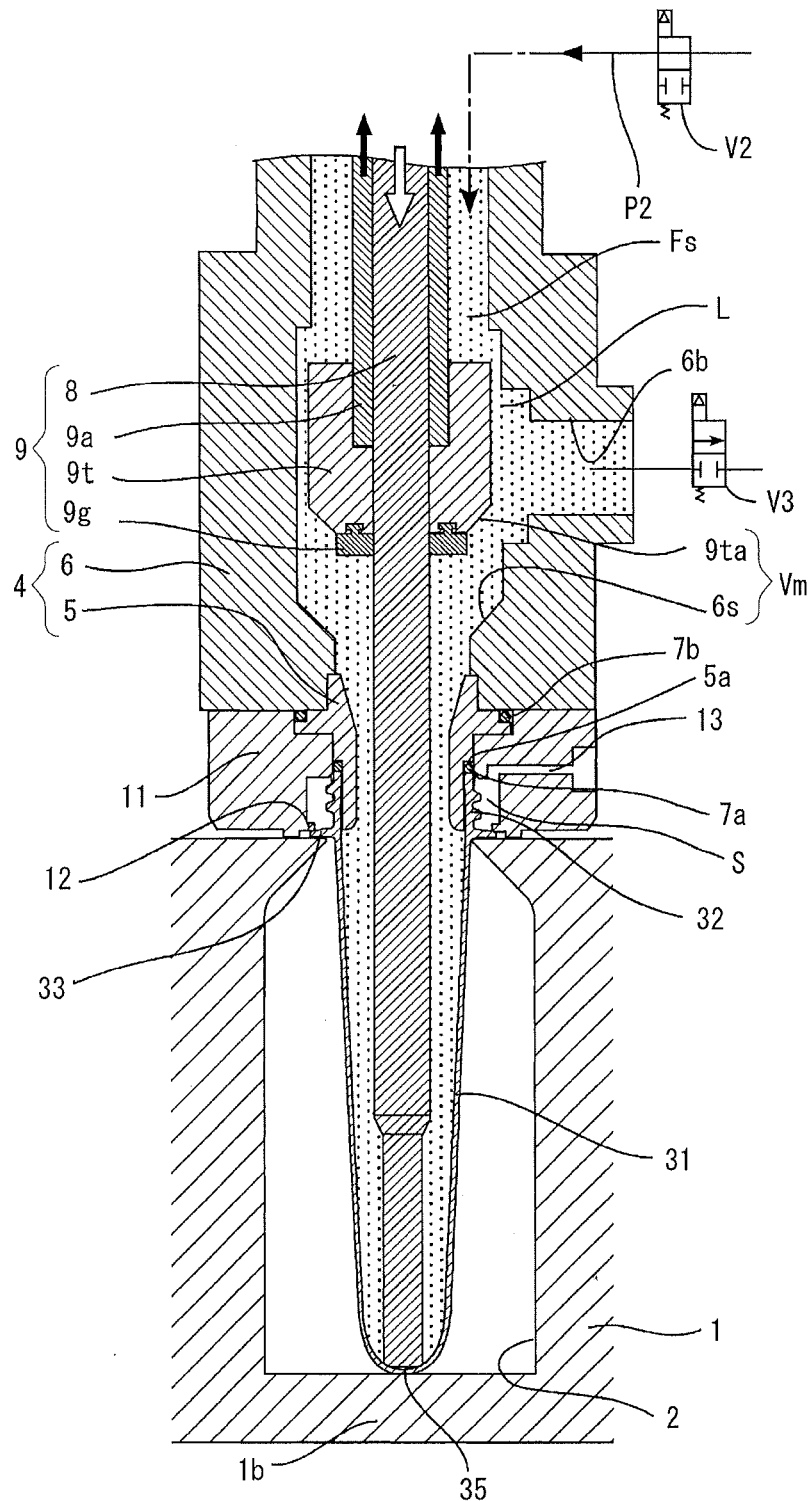
FIG. 11 is a cross-sectional diagram illustrating another example of the molding step.
Figure 12:
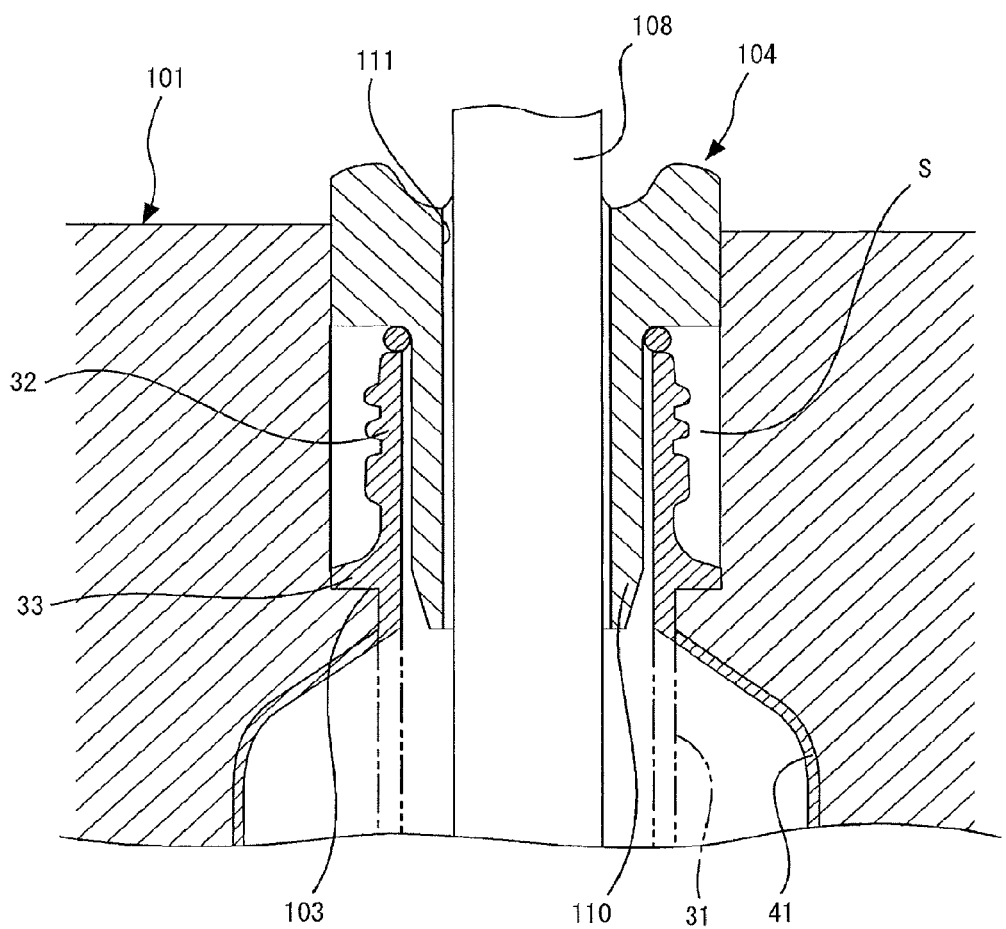
FIG. 12 is a cross-sectional diagram illustrating the main part of an example of a conventional blow molding device using blown air.

In the example of steps for Embodiment 2, vertical stretching by the stretching rod 8 is first performed, and then the pressurized liquid L is fed into the preform 31 with the valve mechanism Vm in the open state. As illustrated in FIG. 11, however, feeding of the pressurized liquid L into the preform 31 may be performed together with vertical stretching by the stretching rod 8. The state in FIG. 11 is a state in which, from the state in FIG. 6, valves V3 and V1 are placed in the closed state, the shaft 9a is raised to place the valve mechanism Vm in the open state, and vertical stretching by the stretching rod 8 has been performed simultaneously with feeding of the pressurized liquid L into the preform 31, so that vertical stretching is complete.

In the steps illustrated in FIG. 11, the vertical stretching is performed with the rod guide 9g removed upward from the reduced diameter portion 6d, yet as described above, even though there is no support by the reduced diameter portion 6d for the rod guide 9g, the stretching rod 8 can be suppressed from wobbling at least by the effect of the rod guide 9g.

Industrial Applicability

As described above, the blow molding device using pressured liquid according to the present invention controls, to a high degree of accuracy, the temperature of liquid fed into preform, without impairing productivity. From the perspectives of improving quality of molded containers and of improving productivity, this blow molding device is therefore expected to be widely applicable in the field of blow molding using a pressurized liquid.

REFERENCE SIGNS LIST

1: Mold
1b: Bottom wall
2: Cavity
4: Blow nozzle
5: Insertion tube
5a: Circumferential step
6: Feed tube
6a: Introduction passage
6b: Exhaust passage
6c: Intake hole
6s: Seal step
6d: Reduced diameter portion
6tg: Top rod guide
7a, 7b: Seal member
8: Rod
9: Seal body
9a: Shaft
9t: Seal tube
9ta: Tapered edge
9g: Rod guide
11: Partitioning member
12: Support flange
13: Intake hole
21: Pressurizing device
22: Pressurized liquid feeding unit
23: Liquid circulating unit
CR: Circulation route
Fc: Flow channel
Fs: Feed channel
Hs: Headspace
L: Liquid
Ls: Liquid surface
P1, P2, P3: Piping
R1, R2: Piping
S: Space
V1, V2, V3, V4: Valve
Vm: Valve mechanism
31: Preform
32: Mouth tube section
33: Neck ring
35: Bottom wall
41: Container
43: Shoulder
44: Body
45: Bottom
101: Mold
103: Neck support flange
104: Blow nozzle
104g: Rod guide
108: Rod
110: Guide tube
111: Insertion hole
R101, R102, R103: Piping
V101: Valve

The invention claimed is:

1. A blow molding device comprising: a mold for blow molding; a blow nozzle to be inserted tightly into a mouth tube section of preform in a bottomed cylindrical shape when the preform is inserted into the mold; a pressurized liquid feeding unit, the blow molding device feeding a pressurized liquid from the pressurized liquid feeding unit into the preform through the blow nozzle to form a container into an expanded shape along a cavity of the mold; and a valve mechanism, at a downstream end of a feed channel for the liquid in the blow nozzle, configured to open and close the feed channel so that when the valve mechanism is in a closed state, the liquid circulates between the feed channel and the pressurized liquid feeding unit, and when the valve mechanism is in an open state, the pressurized liquid is fed through the feed channel into the preform.

2. The blow molding device according to claim 1, further comprising a liquid circulating unit configured to adjust the liquid to a predetermined temperature and feed the liquid to the pressurized liquid feeding unit, wherein the feed channel communicates in an openable and closable manner with the pressurized liquid feeding unit via an introductory passage provided in the blow nozzle at an upstream end of the feed channel and communicates in an openable and closable manner with the liquid circulating unit via an exhaust passage provided at a downstream end at a position on an upstream side of the valve mechanism, and the liquid circulates between the feed channel and the pressurized liquid feeding unit via the liquid circulating unit.

3. The blow molding device according to claim 1, further comprising a rod-shaped seal body inserted into the blow nozzle so as to be displaceable in an axial direction of the blow nozzle, wherein the feed channel is placed in a closed state by abutment of a tip of the seal body against a seal step on an inner circumferential surface of the blow nozzle, and the valve mechanism is configured by abutment and release of abutment of the tip of the seal body against the seal step.

4. The blow molding device according to claim 3, wherein the seal body is formed by a cylindrical rod-shaped shaft and a rod inserted slidably into the shaft in a liquid-tight manner.

5. The blow molding device according to claim 4, wherein the rod is a stretching rod that vertically stretches the preform, the cylindrical rod-shaped shaft is inserted into the blow nozzle in the axial direction, a cylindrical rod guide is connected coaxially to a lower edge of the shaft, the stretching rod is inserted into the connected shaft and rod guide, the stretching rod is inserted into the rod guide slidably in circumferential contact, the shaft, the rod guide, and the stretching rod form the seal body, an inner circumferential surface of the blow nozzle and an outer circumferential surface of the seal body cylindrically form the feed channel for the liquid, when the valve mechanism is in the closed state, the rod guide is inserted in a reduced diameter portion directly below the seal step of the blow nozzle, and when the valve mechanism is in the open state, the rod guide is removed upward from the reduced diameter portion.

6. The blow molding device according to claim 5, wherein the rod guide is made from polyether ether ketone resin.

7. The blow molding device according to claim 5, further comprising a short cylindrical seal tube having a larger diameter than the shaft fit coaxially onto the lower edge of the shaft, wherein a peripheral edge of the seal tube abuts against the seal step, and the rod guide is connected to a lower edge of the seal tube and has a smaller diameter than the seal tube.

8. The blow molding device according to claim 1, further comprising an insertion tube to be inserted into the mouth tube section of the preform at a lower edge of the blow nozzle, wherein a circumferential step that reduces in diameter downwards is provided on an outer peripheral wall of the insertion tube, and by abutment of the circumferential step against an upper edge surface of the mouth tube section with a seal member therebetween, the blow nozzle and the mouth tube section communicate closely.

* * * * *